United States Patent
Pelton (10) Patent No.: US 11,069,020 B2
(45) Date of Patent: Jul. 20, 2021

(54) GRAPHICS PROCESSING USING MULTIPLE PRIMITIVES

(71) Applicant: Microsoft Technology Licensing, LLC, Redmond, WA (US)

(72) Inventor: Blake D. Pelton, Redmond, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 110 days.

(21) Appl. No.: 15/974,519

(22) Filed: May 8, 2018

(65) Prior Publication Data

US 2018/0260930 A1 Sep. 13, 2018

Related U.S. Application Data

(63) Continuation of application No. 13/804,329, filed on Mar. 14, 2013, now abandoned.

(51) Int. Cl.
*G06T 15/00* (2011.01)
*G06T 1/20* (2006.01)
*G06T 11/40* (2006.01)

(52) U.S. Cl.
CPC .............. *G06T 1/20* (2013.01); *G06T 11/40* (2013.01); *G06T 15/00* (2013.01)

(58) Field of Classification Search
CPC ......... G06T 11/40; G06T 1/20; G06T 11/001; G06T 15/005; G06T 15/04; G06T 15/503; G06T 15/00; G06F 9/38
See application file for complete search history.

(56) References Cited

U.S. PATENT DOCUMENTS

| | | | |
|---|---|---|---|
| 6,222,550 B1 | 4/2001 | Rosman et al. | |
| 6,720,964 B1 | 4/2004 | Fowler et al. | |
| 7,168,048 B1 | 1/2007 | Goossen et al. | |
| 7,362,332 B2 | 4/2008 | Gritz | |

(Continued)

FOREIGN PATENT DOCUMENTS

| | | |
|---|---|---|
| CN | 1551048 | 12/2004 |
| CN | 102929621 | 2/2013 |

(Continued)

OTHER PUBLICATIONS

Takashi et al, JP 2006-331191, published: Jul. 12, 2006, pp. 1-17 (Year: 2006).*

(Continued)

*Primary Examiner* — Wilson W Tsui
(74) *Attorney, Agent, or Firm* — Newport IP, LLC; Scott Y. Shigeta (57) ABSTRACT

Techniques for graphics processing using multiple primitives are described. Generally, graphical elements displayed on a computing device can be constructed from multiple primitives. In at least some embodiments, techniques can combine multiple primitives for processing. For example, overlap of a primitive with another primitive can be detected. The primitives can be processed together for display in a pixel region, e.g., as a single primitive. The primitives can be processed by a graphics processor, such as by blending the primitives, applying visual effects to the primitives, and so on. The processed primitives can be written to memory such that the processed primitives can be accessed and displayed by a display device.

20 Claims, 8 Drawing Sheets

(56) References Cited

U.S. PATENT DOCUMENTS

| | | | |
|---|---|---|---|
| RE42,287 E | | 4/2011 | Apodaca et al. |
| 8,004,522 B1 | | 8/2011 | Toksvig et al. |
| 8,081,184 B1 | | 12/2011 | Nordquist |
| 8,253,977 B2 | | 8/2012 | Mori |
| 8,259,111 B2 | | 9/2012 | Goel et al. |
| 8,319,784 B2 | | 11/2012 | Srinivasan et al. |
| 8,339,653 B2 | | 12/2012 | Nguyen et al. |
| 8,345,063 B2 | | 1/2013 | Iourcha et al. |
| 8,537,168 B1 | | 9/2013 | Steiner et al. |
| 8,561,038 B1 | | 10/2013 | Sams |
| 9,058,792 B1 | * | 6/2015 | Edmondson ............ G09G 5/363 |
| 2004/0212619 A1 | | 10/2004 | Saito et al. |
| 2006/0080398 A1 | | 4/2006 | Hoover et al. |
| 2010/0241650 A1 | * | 9/2010 | Chittar ................ G06F 16/5854 707/769 |
| 2011/0080407 A1 | | 4/2011 | Duluk, Jr. et al. |
| 2011/0235902 A1 | * | 9/2011 | Chittar ................ G06K 9/3208 382/162 |
| 2011/0238659 A1 | * | 9/2011 | Chittar ................ G06F 16/5838 707/724 |
| 2011/0249011 A1 | | 10/2011 | Lanlonde et al. |
| 2011/0314031 A1 | * | 12/2011 | Chittar ................... G06Q 30/00 707/749 |
| 2012/0050313 A1 | | 3/2012 | Gruber |
| 2012/0262493 A1 | | 10/2012 | Tsai et al. |
| 2013/0229414 A1 | * | 9/2013 | Gruber ................... G06T 15/40 345/426 |
| 2014/0267327 A1 | | 9/2014 | Pelton |

FOREIGN PATENT DOCUMENTS

| | | |
|---|---|---|
| JP | H10149148 | 6/1998 |
| JP | 2007114924 | 5/2007 |
| JP | 2009278468 | 11/2009 |
| JP | 2010527077 | 8/2010 |
| JP | 2012163621 | 8/2012 |
| JP | 2013504131 | 2/2013 |
| KR | 20090082907 A | 7/2009 |

OTHER PUBLICATIONS

"Final Office Action", U.S. Appl. No. 13/804,329, dated Jan. 27, 2017, 40 pages.

"Final Office Action", U.S. Appl. No. 13/804,329, dated Feb. 8, 2018, 46 pages.

"Final Office Action", U.S. Appl. No. 13/804,329, dated Oct. 16, 2015, 29 pages.

"Foreign Office Action", CN Application No. 201480015395.0, dated May 4, 2017, 9 pages.

"Foreign Office Action", CN Application No. 201480015395.0, dated Jun. 28, 2017, 7 pages.

"Foreign Office Action", CN Application No. 201480015395.0, dated Dec. 20, 2016, 19 pages.

"Foreign Office Action", JP Application No. 2016-501096, dated Feb. 27, 2018, 8 pages.

"International Search Report and Written Opinion", Application No. PCT/US2014/022891, dated Sep. 5, 2014, 18 Pages.

"Non-Final Office Action", U.S. Appl. No. 13/804,329, dated May 13, 2015, 23 pages.

"Non-Final Office Action", U.S. Appl. No. 13/804,329, dated Jun. 16, 2016, dated 29 pages.

"Non-Final Office Action", U.S. Appl. No. 13/804,329, dated Aug. 7, 2017, 40 pages.

"Second Written Opinion", Application No. PCT/US2014/022891, dated Dec. 17, 2014, 4 Pages.

Fatahalian,"Reducing Shading on GPUs using Quad-Fragment Merging", In Journal of ACM Transactions on Graphics, vol. 29, Issue 4, Jul. 2010, 8 pages.

Jeong,"A QoS-Aware Memory Controller for Dynamically Balancing GPU and CPU Bandwidth Use in an MPSoC", Proceedings of the 49th Annual Design Automation Conference, Available at <http://lph.ece.utexas.edu/merez/uploads/MattanErez/cpugpumc_dac12.pdf>, Jun. 3, 2012, 6 pages.

"Office Action Issued in Korean Patent Application No. 10-2015-7025328", dated May 29, 2020, 19 Pages.

"Notice of Allowance Issued in Korean Patent Application No. 10-2015-7025328", dated Nov. 3, 2020, 7 Pages.

* cited by examiner

GRAPHICS PROCESSING USING MULTIPLE PRIMITIVES

RELATED APPLICATION

This application is a continuation of and claims priority to U.S. patent application Ser. No. 13/804,329, filed Mar. 14, 2013, entitled "Graphics Processing using Multiple Primitives", the entire disclosure of which is hereby incorporated by reference herein in its entirety.

BACKGROUND

Today's computing devices typically have access to a variety of visual content. Displaying visual content, however, can be resource-intensive. For example, displaying a user interface for an application can involve multiple operations. Examples of such operations include reading graphics data for the user interface from memory, processing the graphics data, storing intermediate processing results in memory, and writing a final processed image for the user interface to memory such that it can be read from memory and displayed. These operations are typically performed on a frame-by-frame basis, thus consuming valuable memory and processing resources. For a device operating on battery power (e.g., a mobile computing device), these operations additionally consume battery power and can thus shorten charge life. Thus, controlling the impact of graphics operations on device resources is an important consideration.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Techniques for graphics processing using multiple primitives are described. Generally, graphical elements displayed on a computing device can be constructed from multiple primitives. Examples of primitives include lines, curves, quadrilaterals, and so forth, that can be combined to generate larger graphical elements. Thus, primitives can be painted via pixels in regions of a display to generate graphical elements, such as portions of a graphical user interface of an application.

In at least some embodiments, techniques can combine multiple primitives for processing. For example, overlap of a primitive with another primitive can be detected. The primitives can be processed together for display in a pixel region, e.g., as a single primitive. The primitives, for instance, can be read by a graphics processor from memory. The primitives can be processed by a graphics processor, such as by blending the primitives, applying visual effects to the primitives, and so on. The processed primitives can be written to memory (e.g., via a single write operation) such that the processed primitives can be accessed and displayed by a display device.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

Techniques for graphics processing using multiple primitives are described. Generally, graphical elements displayed on a computing device can be constructed from multiple primitives. Examples of primitives include lines, curves, quadrilaterals, and so forth, that can be combined to generate larger graphical elements. Thus, primitives can be painted via individual pixels in regions of a display to generate graphical elements, such as portions of a graphical user interface of an application.

In at least some embodiments, techniques can combine multiple primitives for processing. For example, overlap of a primitive with another primitive can be detected. The primitives can be processed together for display in a pixel region, e.g., as a single primitive. The primitives, for instance, can be read by a graphics processor from memory. The primitives can be processed by the graphics processor, such as by blending the primitives, applying visual effects to the primitives, and so on. The processed primitives can be written to memory (e.g., via a single write operation) such that the processed primitives can be accessed and displayed by a display device. Further details and variations are discussed below.

In the following discussion, an example environment is first described that is operable to employ techniques described herein. Next, a section entitled "Example Procedures" describes some example methods in accordance with one or more embodiments. Following this, a section entitled "Example Implementation Scenario" describes an example implementation scenario in accordance with one or more embodiments. Finally, a section entitled "Example System and Device" describes an example system and device that are operable to employ techniques discussed herein in accordance with one or more embodiments.

Having presented an overview of example implementations in accordance with one or more embodiments, consider now an example environment in which example implementations may by employed.

Example Environment

Figure 1:
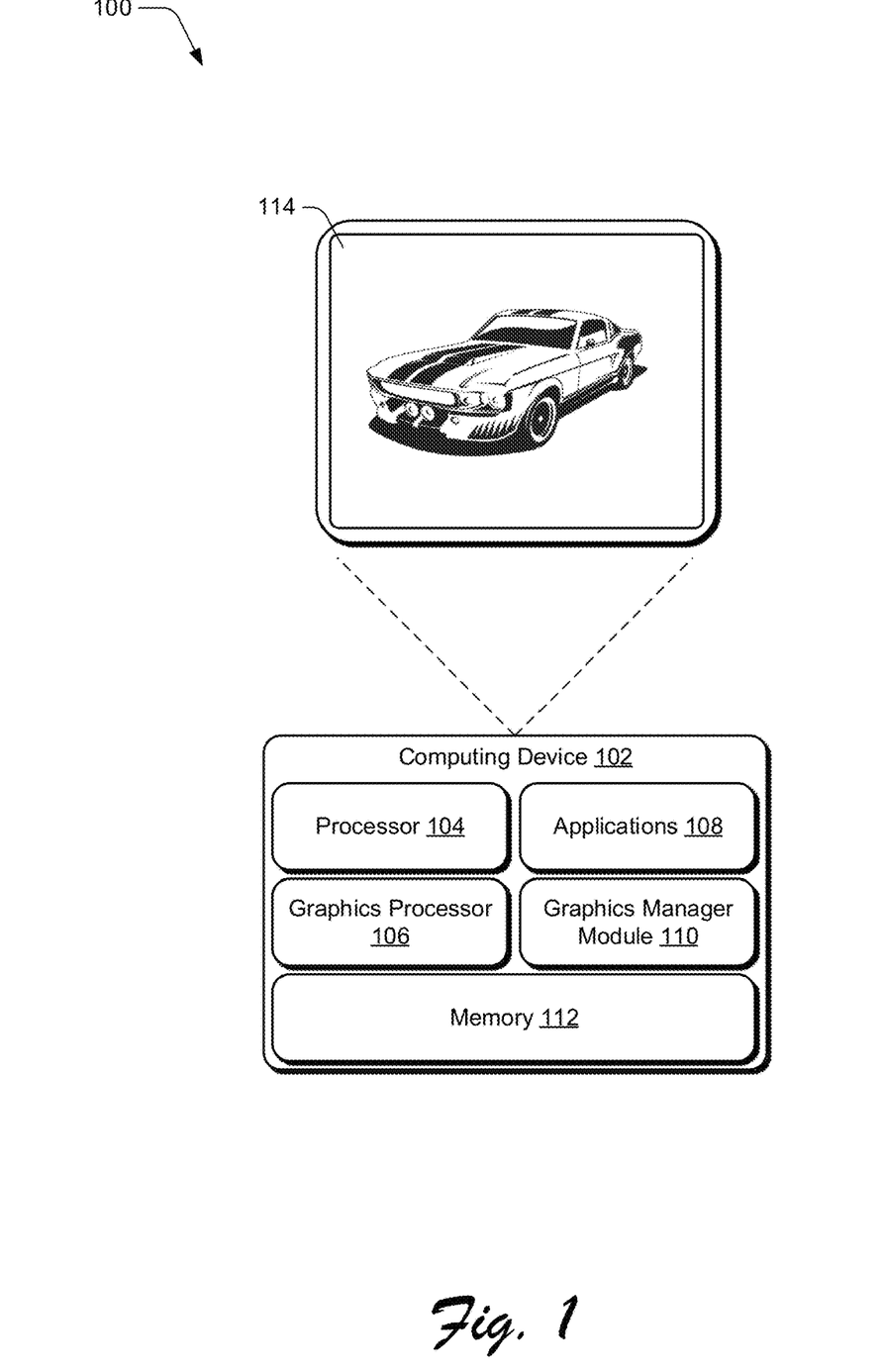
FIG. 1 is an illustration of an environment in an example implementation that is operable to employ techniques discussed herein.

FIG. 1 is an illustration of an environment 100 in an example implementation that is operable to employ techniques for graphics processing using multiple primitives described herein. The illustrated environment 100 includes a computing device 102 that may be configured in a variety of ways. For example, the computing device 102 may be configured as a traditional computer (e.g., a desktop personal computer, laptop computer, and so on), a mobile station, an entertainment appliance, a set-top box communicatively coupled to a television, a wireless phone, a netbook, a game console, a handheld device (e.g., a tablet), and so forth as further described in relation to FIG. 8.

Computing device 102 includes a processor 104, which is representative of functionality to perform various types of data processing for the computing device 102. For example, the processor 104 can represent a central processing unit (CPU) of the computing device 102. Further examples of implementations of the processor 104 are discussed below with reference to FIG. 8.

Further illustrated is a graphics processor 106, which is representative of functionality to perform various graphics-related tasks for the computing device 102. The graphics processor 106, for example, can represent a graphics processing unit (GPU) of the computing device 102.

The computing device 102 further includes applications 108 and a graphics manager module 110. The applications 108 are representative of functionalities to perform various tasks via the computing device 102. Examples of the applications 108 include a word processor application, an email application, a content editing application, a web browsing application, and so on.

The graphics manager module 110 is representative of functionality to perform various tasks further to techniques for graphics processing using multiple primitives discussed herein. The graphics manager module 110, for instance, can be implemented as a component of an operating system for the computing device 102. Embodiments, however, can employ a variety of different configurations and implementations of the graphics manager module 110. Further details concerning implementation of the graphics manager module 110 are discussed below.

The computing device 102 further includes a memory 112, which is representative of a data storage medium that can be written to and read from by various functionalities of the computing device 102. The memory 112, for example, can represent a primary memory of the computing device 102. Further details and examples of the memory 112 are discussed below with reference to FIG. 8.

A display device 114 is also illustrated, which is configured to output graphics for the computing device 102. For instance, consider an example implementation where one of the applications 108 is currently running and submits graphic elements of the application 108 to be displayed via the display device 114. Utilizing the processor 104, the graphics manager module 110 can implement techniques discussed herein to inspect the graphic elements and make decisions as to how the graphic elements are to be processed by the graphics processor 106. As detailed herein, processing decisions for graphic elements can be based on various attributes of the graphic elements, such as primitive overlap, visual effects to be applied to graphic elements, visual complexity of graphic elements, and so forth.

Based on the processing decisions, the graphics manager module 110 generates processing instructions for the graphic elements that specify how the graphic elements are to be processed. As used herein, the term "instruction" refers to computer-executable instructions, such as executable code that can be read and processed by a processor. The graphics manager module 110 submits the processing instructions to the graphics processor 106, which reads the graphics elements from the memory 112 and utilizes the processing instructions to process the graphics elements. The graphics processor 106 writes the processed graphics elements to the memory 112. The display device 114 can then read the processed graphics elements from the memory 112 (e.g., via a display controller), and display the processed graphics elements.

Having described an example environment in which the techniques described herein may operate, consider now some example procedures in accordance with one or more embodiments.

Example Procedures

The following discussion describes some example procedures for graphics processing using multiple primitives in accordance with one or more embodiments. The example procedures may be employed in the environment 100 of FIG. 1, the system 800 of FIG. 8, and/or any other suitable environment.

Figure 2:
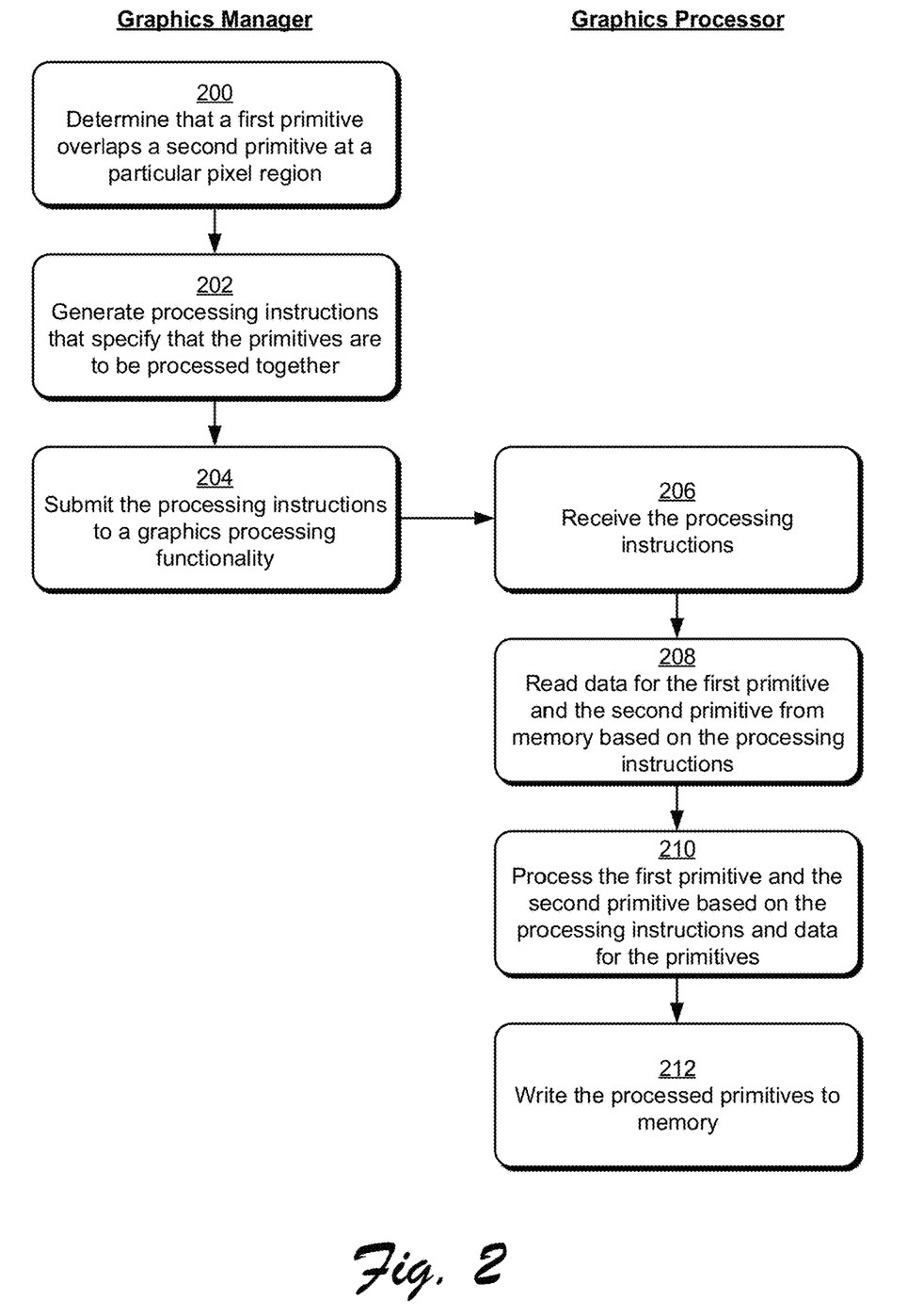
FIG. 2 is a flow diagram that describes steps in a method in accordance with one or more embodiments.

FIG. 2 is a flow diagram that describes steps in a method in accordance with one or more embodiments. The method is illustrated as steps that are performed by a graphics manager, and steps that are performed by a graphics processor. This allocation of steps is presented for purpose of example only, however, and the steps can be performed by one or more of a variety of different functionalities.

In at least some embodiments, the method can be performed on a frame-by-frame basis while graphics are being processed and rendered on a device. Thus, the method describes an example way of compositing and/or rendering graphics for display on a display device.

Step 200 determines that a first primitive overlaps a second primitive at a particular pixel region. For a particular display region, for example, a determination can be made that a particular primitive is layered on top of one or more other primitives.

A variety of different techniques can be utilized to determine primitive overlap, and an amount of overlap between primitives. For example, a spatial data structure can be employed to characterize primitives that are to be displayed in a region of a display area, such as some or all of the primitives to be displayed as part of a particular display frame. Various types of spatial data structures can be employed, such as a quad tree, a k-dimensional tree, a binary space partitioning (BSP) tree, and so forth. Thus, a spatial data structure that characterizes pixel regions for a group of primitives can be inspected to determine which of the primitives overlap, and/or how much overlap exists between overlapping primitives.

Step 202 generates processing instructions that specify that the primitives are to be processed together. The processing instructions, for example, can specify that graphics data for the primitives is to be read from memory. The processing instructions may further indicate that the primitives are to be combined as a single primitive to be processed and written to memory. For example, the processing instructions can specify that the primitives are to be processed and the final processing results written to memory, without intermediate processing results being written to memory. The processing instructions may also specify visual effects to be applied to the individual and/or combined primitives, such as blending, clipping, shading, and so forth. In at least some embodiments, the processing instructions can indicate that after the primitives are processed, the processed primitives are to be written to memory via a single write operation.

Step 204 submits the processing instructions to a graphics processing functionality. The processing instructions, for example, can be submitted to the graphics processor 106.

Step 206 receives the processing instructions. The graphics processor 106, for example, can receive the instructions.

Step 208 reads data for the first primitive and the second primitive from memory based on the processing instructions. For example, an associated application can write data for the primitives to a region of memory, and a graphics processor can read the data from the region of memory. The data can specify various information for the primitives, such as color, shading, transparency, opacity, display region information, and so on.

Step 210 processes the first primitive and the second primitive based on the processing instructions and data for the primitives. Visual processing specified by the processing instructions can be applied to the primitives, such as various types of visual effects.

Step 212 writes the processed primitives to memory. Data for the processed primitives, for example, can be written to a region of memory via a single write operation and independent of an intermediate write to memory during processing. For instance, the processed primitives can be written to a render target portion of memory that is used to store processed primitives. The processed primitives can be read from the region of memory and displayed, such as via a display controller for a display device.

For ease of illustration, the procedure described above is discussed with reference to two primitives. It is to be appreciated, however, that techniques discussed herein can be employed to process several overlapping primitives, e.g., more than two. For example, three or more primitives can be read from memory, processed, and written back to memory for display without an intermediate memory write during processing.

Figure 3:
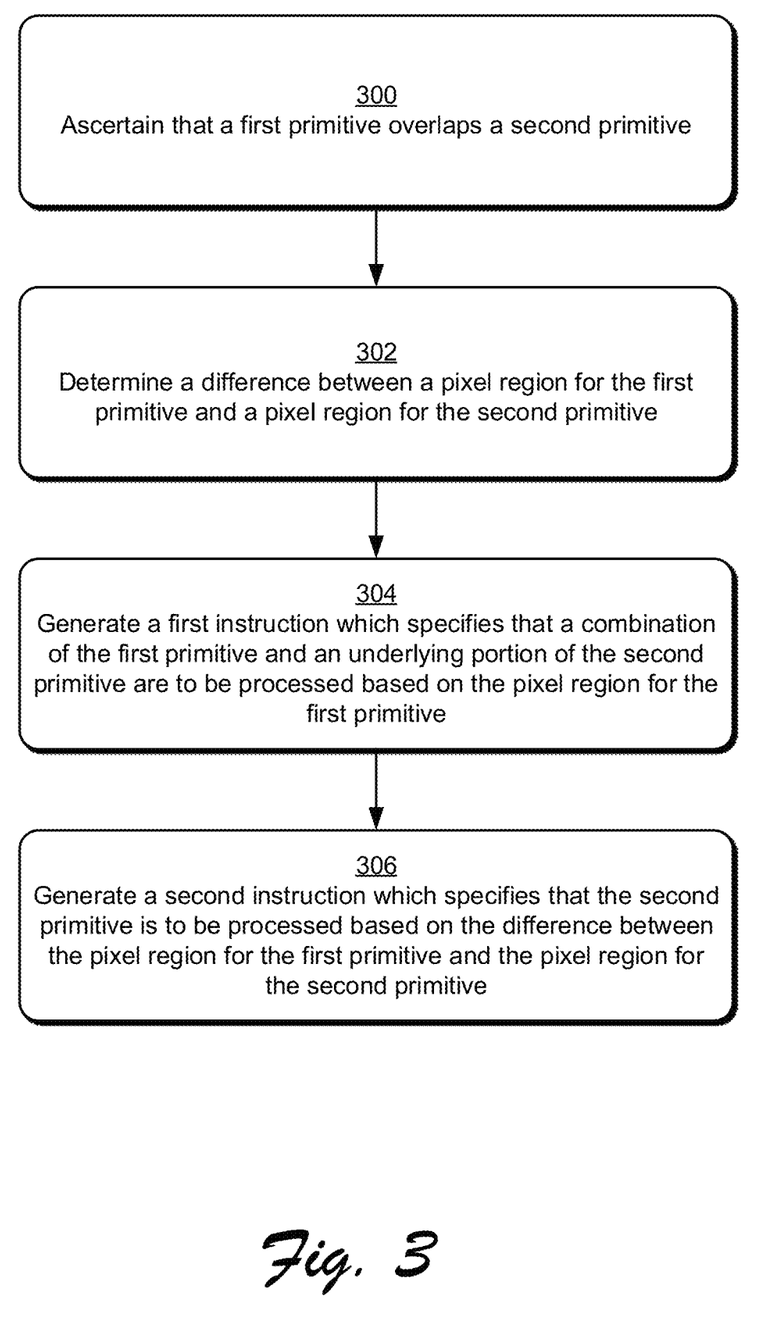
FIG. 3 is a flow diagram that describes steps in a method in accordance with one or more embodiments.

FIG. 3 is a flow diagram that describes steps in a method in accordance with one or more embodiments. In at least some embodiments, the method describes an example implementation of step 200 discussed above with reference to FIG. 2.

Step 300 ascertains that a first primitive overlaps a second primitive. A graphics manager, for example, can determine for a particular frame that a pixel region for one primitive at least partially overlaps a pixel region for another primitive.

Step 302 determines a difference between a pixel region for the first primitive and a pixel region for the second primitive. The difference, for instance, can correspond to a portion of the pixel region for the second primitive that is not overlapped by the pixel region for the first primitive. An illustration of determining a difference between pixel regions for primitives is discussed below with reference to FIG. 7. A variety of techniques for calculating a difference between pixel regions for primitives can be employed, at least some of which are discussed above and below.

Step 304 generates a first instruction which specifies that a combination of the first primitive and an underlying portion of the second primitive are to be processed based on the pixel region for the first primitive. The first instruction, for example, can specify that for the pixel region for the first primitive, the first primitive and a portion of the second primitive positioned beneath the first primitive are to be processed together. Thus, the first instruction can identify the first primitive and the underlying portion of the second primitive as a single primitive to be processed.

Step 306 generates a second instruction which specifies that the second primitive is to be processed based on the difference between the pixel region for the first primitive and the pixel region for the second primitive. The second instruction, for example, can omit the portion of the second primitive specified in the first instruction. Thus, the remaining portion of the second primitive (e.g., the portion not specified in the first instruction) can be processed as a single primitive. In at least some embodiments, omitting the portion of the second primitive specified in the first instruction can save memory and/or processing resources that would be used to process the omitted portion a second time, e.g., after it has already been processed based on the first instruction.

As discussed above with reference to FIG. 2, the first instruction and the second instruction can be submitted to a graphics processor as part of processing instructions for a set of primitives.

While this method is discussed with reference to processing two primitives, this is not intended to be limiting, and the method can be employed to generate processing instructions for multiple overlapping primitives in accordance with one or more embodiments.

According to various embodiments, determining a difference between pixel regions for primitives can be performed in a variety of ways. For example, a graphics functionality (e.g., the graphics manager module 110) can leverage a processing unit of a computing device (e.g., the processor 104) to perform difference calculations. Alternatively or additionally, a graphics functionality can leverage functionality of a graphics processor (e.g., the graphics processor 106) to perform difference calculations.

For example, pixel data for primitives can be submitted to a graphics processor with a request to calculate a difference between pixel regions for the primitives. The graphics processor can utilize z-buffering techniques (e.g., a depth buffer) to process the pixel data (e.g., pixel coordinates) and determine a difference between pixel regions for the primitives. The graphics processor can utilize the difference between the pixel regions to make decisions concerning how the primitives are to be processed, e.g., based on processing instructions received from a graphics manager. As an example implementation, consider the follow method.

Figure 4:
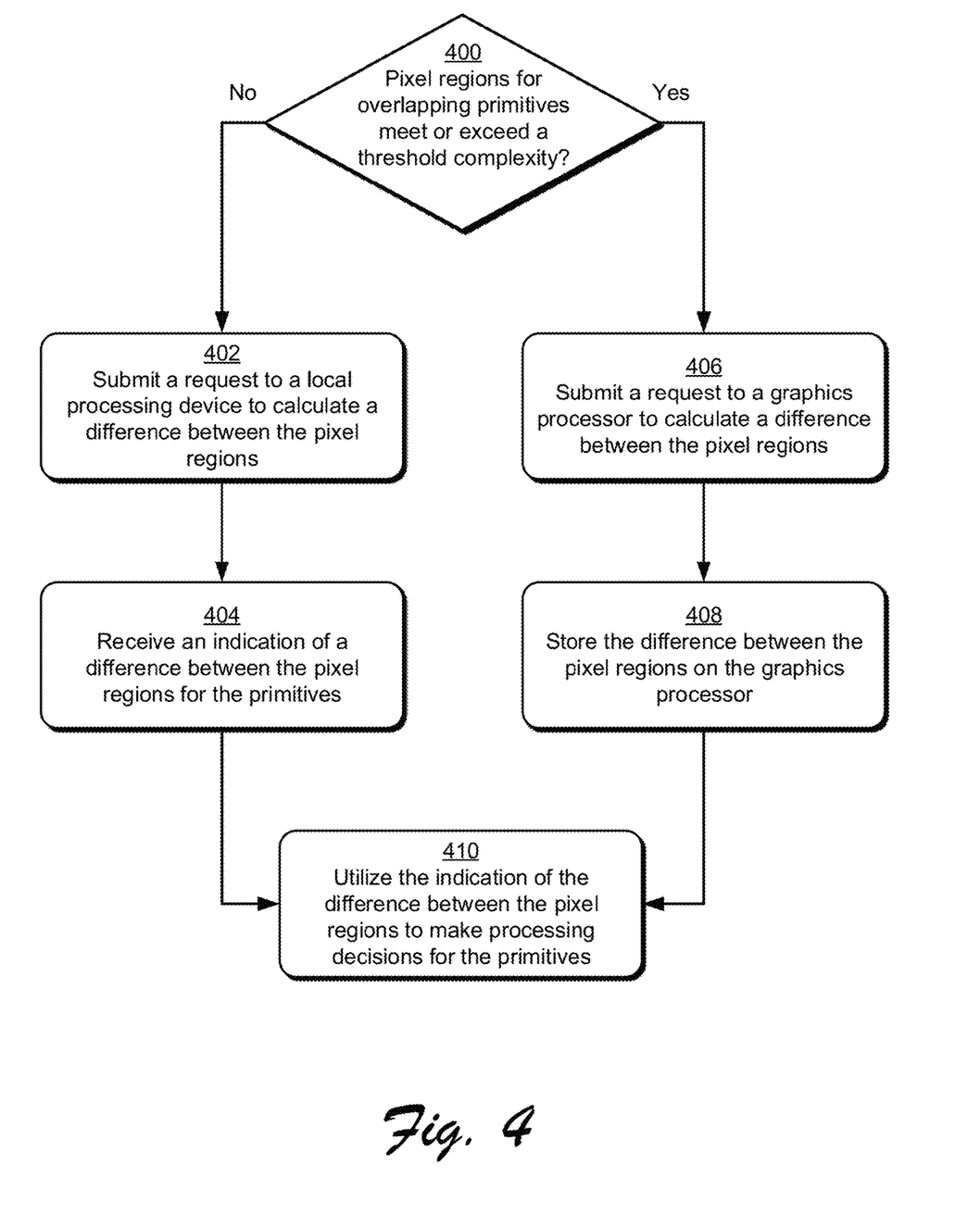
FIG. 4 is a flow diagram that describes steps in a method in accordance with one or more embodiments.

FIG. 4 is a flow diagram that describes steps in a method in accordance with one or more embodiments. Step 400 determines whether pixel regions for overlapping primitives meet or exceed a threshold complexity. The threshold complexity, for example, can specify a threshold number of primitives that overlap. In another example, the threshold complexity can specify a threshold pixel area for overlapping primitives. A wide variety of other parameters can be considered for a threshold complexity.

If the pixel regions for the overlapping primitives do not meet or exceed the threshold complexity ("No"), step 402 submits a request to a local processing device to calculate a difference between the pixel regions. The graphics manager module 110, for example, can submit instructions to the processor 104 requesting that the processor calculate a difference between pixel regions for the primitives.

Step 404 receives an indication of a difference between the pixel regions for the primitives. For example, the graphics manager module 110 can receive a difference calculation from the processor 104 and/or the graphics processor 106.

Returning to step 400, if the pixel regions for the overlapping primitives meet or exceed the threshold complexity ("Yes"), step 406 submits a request to a graphics processor to calculate a difference between the pixel regions. The graphics manager module 110, for instance, can submit instructions to the graphics processor 106 requesting that the graphics processor calculate a difference between pixel regions for the primitives. In at least some embodiments, the instructions can specify that a depth buffer of the graphics processor is to be employed to perform the difference calculations.

Step 408 stores the difference between the pixel regions on the graphics processor. The difference, for example, can be stored in a depth buffer of a GPU.

Step 410 utilizes the indication of the difference between the pixel regions to make processing decisions for the primitives. For example, in a scenario where the difference is calculated on a local processing device (e.g., step 402), the difference can be submitted to a graphics processor to be used in determining how to process the primitives. In a scenario where the difference is calculated and stored by a graphic processor, the graphics processor can simply access the difference information locally to make processing decisions for the primitives. Examples of such decisions are discussed above and below.

The example provided above presents an "either/or" scenario with reference to utilizing a local processor or a graphics processor. However, this is not intended to be limiting, and at least some embodiments may utilize both a local processor and a graphics processor to perform various aspects of difference calculations. For example, a group of difference calculations can be divided into more complex and less complex calculations. The less complex calculations can be submitted to a local processor to be performed, and the more complex calculations can be submitted to graphics processor to be performed. Thus, a local processor and a graphics processor can be separately leveraged to perform difference calculations, and/or a combination of a local processor and a graphics processor can be employed to perform difference calculations.

In at least some embodiments, techniques discussed herein can specify how overlapping primitives are to be rendered based on visual attributes of the primitives. For example, consider the following method.

Figure 5:
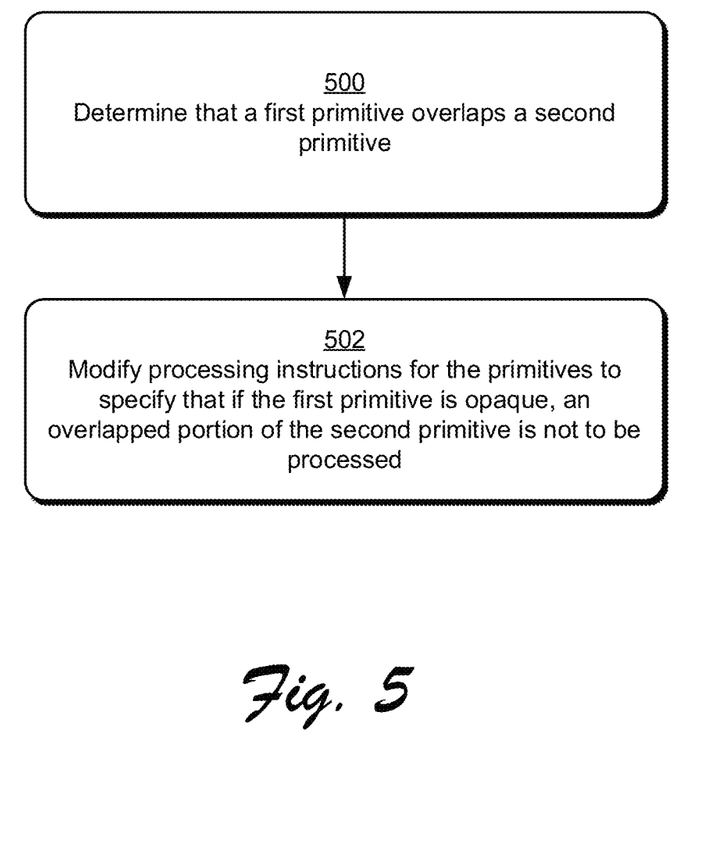
FIG. 5 is a flow diagram that describes steps in a method in accordance with one or more embodiments.

FIG. 5 is a flow diagram that describes steps in a method in accordance with one or more embodiments. Step 500 determines that a first primitive overlaps a second primitive. A z-order for the primitives, for example, can specify that for a particular frame, the first primitive overlaps some or all of the second primitive.

Step 502 modifies processing instructions for the primitives to specify that if a pixel of the first primitive is opaque, an overlapped pixel of the second primitive is not to be processed. For example, processing instructions for the primitives can be modified to specify that the first primitive is to be inspected on a pixel-by-pixel basis to identify opaque pixels. If opaque pixels are identified that overlap pixels of the second primitive, the overlapped pixels of the second primitive (e.g., some or all of the second primitive) are not to be processed and/or written to memory.

For instance, consider a scenario where an overlapping portion of the first primitive includes some opaque pixels and some non-opaque pixels, e.g., translucent pixels, transparent pixels, and so forth. In such a scenario, pixels of the second primitive overlapped by opaque pixels of the first primitive are not processed and/or written to memory. However, pixels of the second primitive overlapped by non-opaque pixels can be processed, e.g., blended with the overlapping pixels of the first primitive according to techniques discussed herein.

As with techniques discussed above, the first primitive and the second primitive can be combined together (e.g., by the graphics manager module 110) as a single combined primitive for processing by a graphics processor, e.g., the graphics processor 106. For instance, based on the processing instructions for the single combined primitive, a graphics processor can process the first primitive and any non-overlapped portions of the second primitive from memory.

In an example embodiment where the second primitive is fully overlapped by the first primitive, data for the second primitive may simply not be processed and/or not written to memory. Thus, portions of a primitive that are overlapped by opaque pixels of another primitive can be omitted from a compositing operation.

Thus, when a primitive that is at least partially opaque would obscure pixels of an underlying primitive such that the pixels of the underlying primitive would not contribute to a visual appearance of an associated display region, techniques can conserve resources (e.g., processing and/or memory resources) by instructing a graphics processor to omit pixels of an underlying primitive overlapped by opaque pixels of the overlapping primitive.

In at least some embodiments, techniques discussed herein can be leveraged to perform various types of graphics processing on primitives, such as applying visual effects as discussed above. For example, consider the following method.

Figure 6:
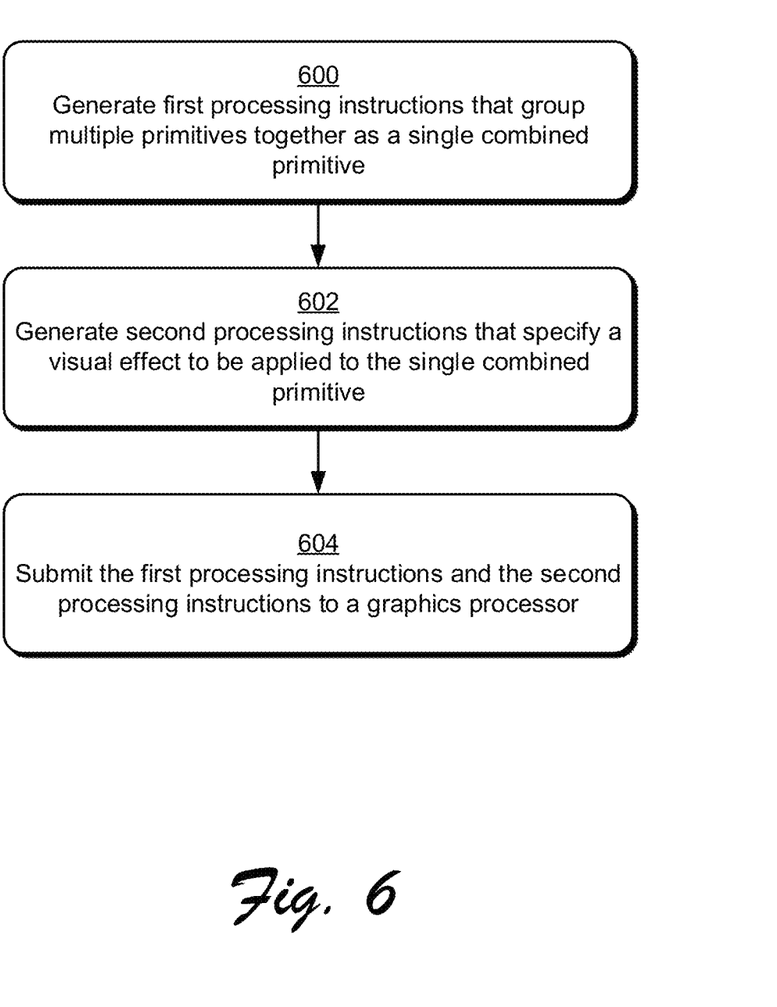
FIG. 6 is a flow diagram that describes steps in a method in accordance with one or more embodiments.

FIG. 6 is a flow diagram that describes steps in a method in accordance with one or more embodiments. Step 600 generates first processing instructions that group multiple primitives together as a single combined primitive. For example, implementations discussed above to combine primitives (e.g., based on primitive overlap) can be employed to combine two or more overlapping primitives into a single combined primitive.

Step 602 generates second processing instructions that specify a visual effect to be applied to the single combined primitive. Examples of a visual effect include clipping, shading, gray scaling, fading, and so on.

In at least some embodiments, a visual effect can include anti-aliasing effects to be applied to a combined primitive. Generally, anti-aliasing refers to techniques for smoothing edges of graphics, such as via pixel shading and/or tinting to avoid jagged edges in pixel graphics. Thus, instructions for a visual effect can include pixel coverage values for anti-aliasing. For example, coverage values can include color shading and/or tinting to be applied to individual pixels as part of anti-aliasing techniques.

Step 604 submits the first processing instructions and the second processing instructions to a graphics processor. The processing instructions, for example, can be generated by the graphics manager module 110, and submitted to the graphics processor 106 to be executed.

Example Implementation Scenario

The following discussion describes an example implementation scenario for techniques for graphics processing using multiple primitives described herein. The example implementation scenario may be implemented in the environment 100 of FIG. 1, the system 800 of FIG. 8, and/or any other suitable environment. The implementation scenario may utilize aspects of the various procedures discussed above.

Figure 7:
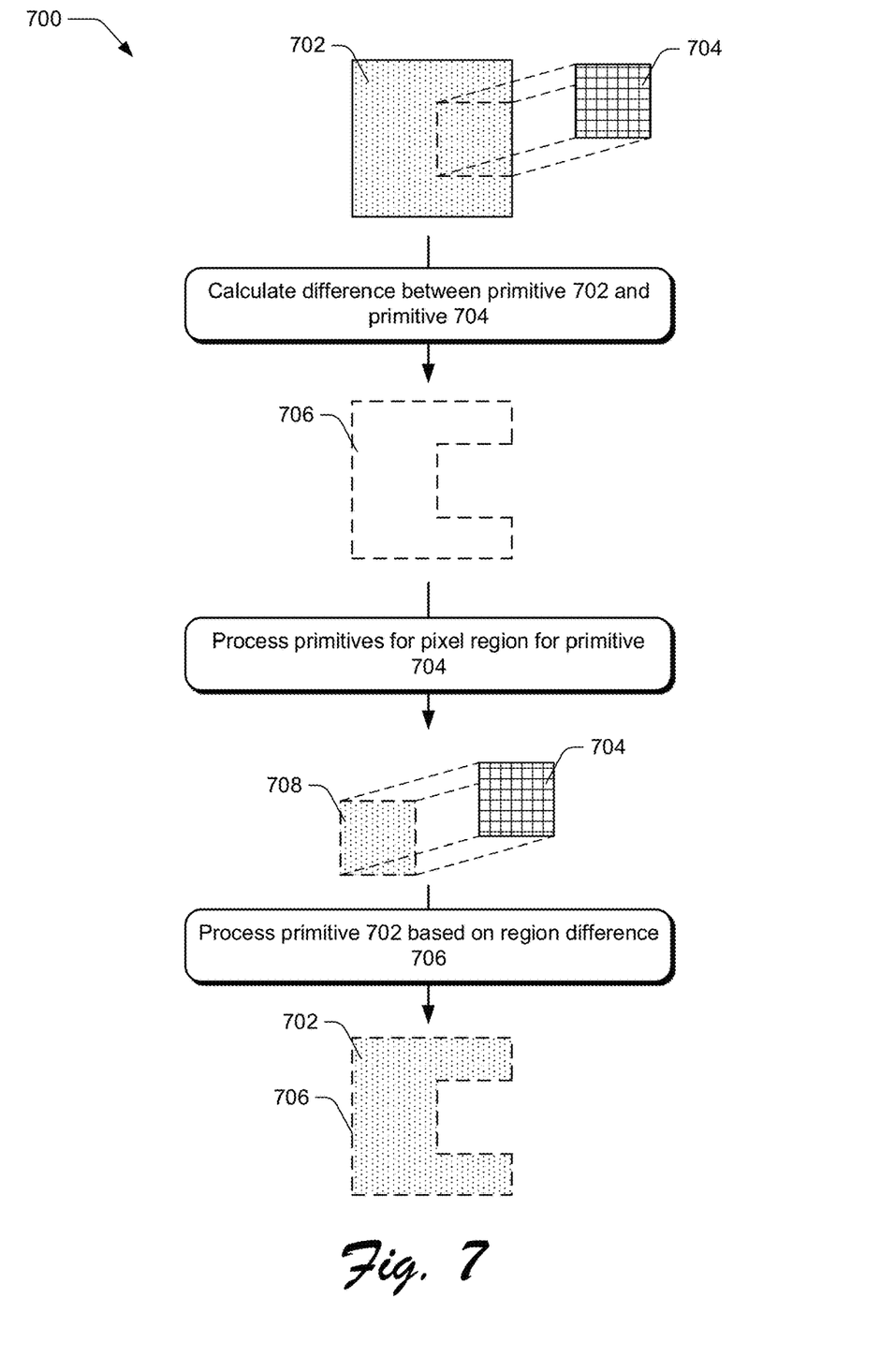
FIG. 7 illustrates an example implementation scenario in accordance with one or more embodiments.

FIG. 7 illustrates an example implementation scenario 700 in accordance with one or more embodiments. The upper portion of the scenario 700 includes a primitive 702 and a primitive 704, which are representative of data for primitives to be rendered and displayed as part of a group of pixels of a display region. The primitives 702, 704, for example, can be part of a graphics element associated with one of the applications 108. The primitives 702, 704 can be different sizes, colors, shading, levels of opacity or transparency, and so on.

Further to the scenario 700, the primitives 702, 704 have a respective z-order that specifies that the primitive 704 overlaps the primitive 702. Thus, instructions for the primitive 702 specify a particular pixel region in which the primitive 702 is to be displayed. Instructions for the primitive 704 specify a sub-region of the particular pixel region in which the primitive 704 is to be displayed.

Continuing to the next portion of the scenario 700, a region difference 706 between the primitive 702 and the primitive 704 is calculated. The region difference 706, for example, can correspond to a difference between a pixel region (e.g., group of pixels) in which the primitive 702 is to be displayed, and a pixel region in which the primitive 704 is to be displayed. For instance, a pixel region for the primitive 704 can be subtracted from a pixel region for the primitive 702 to determine the region difference 706 between the primitives, e.g., a pixel region covered by the primitive 702 but not the primitive 704.

Proceeding to the next portion of the scenario 700, instructions are generated to process a portion 708 of the primitive 702 and the primitive 704 based on the pixel region for the primitive 704. For example, the portion 708 corresponds to a portion of the primitive 702 that is positioned beneath the primitive 704. Thus, processing the pixel region for the primitive 704 can include blending respective portions of both the primitive 702 and the primitive 704.

Proceeding to the bottom portion of the scenario 700, instructions are generated to process the primitive 702 based on the region difference 706. Processing the pixel region for the region difference 706 thus excludes processing the primitive 704 and the portion 708 of the primitive 702.

The instructions generated via the scenario 700 can be submitted to a graphics processor for execution such that the primitives 702, 704 can be processed and displayed, such as utilizing techniques discussed herein.

Having discussed an example implementation scenario, consider now a discussion of an example system and device in accordance with one or more embodiments.

Example System and Device

Figure 8:
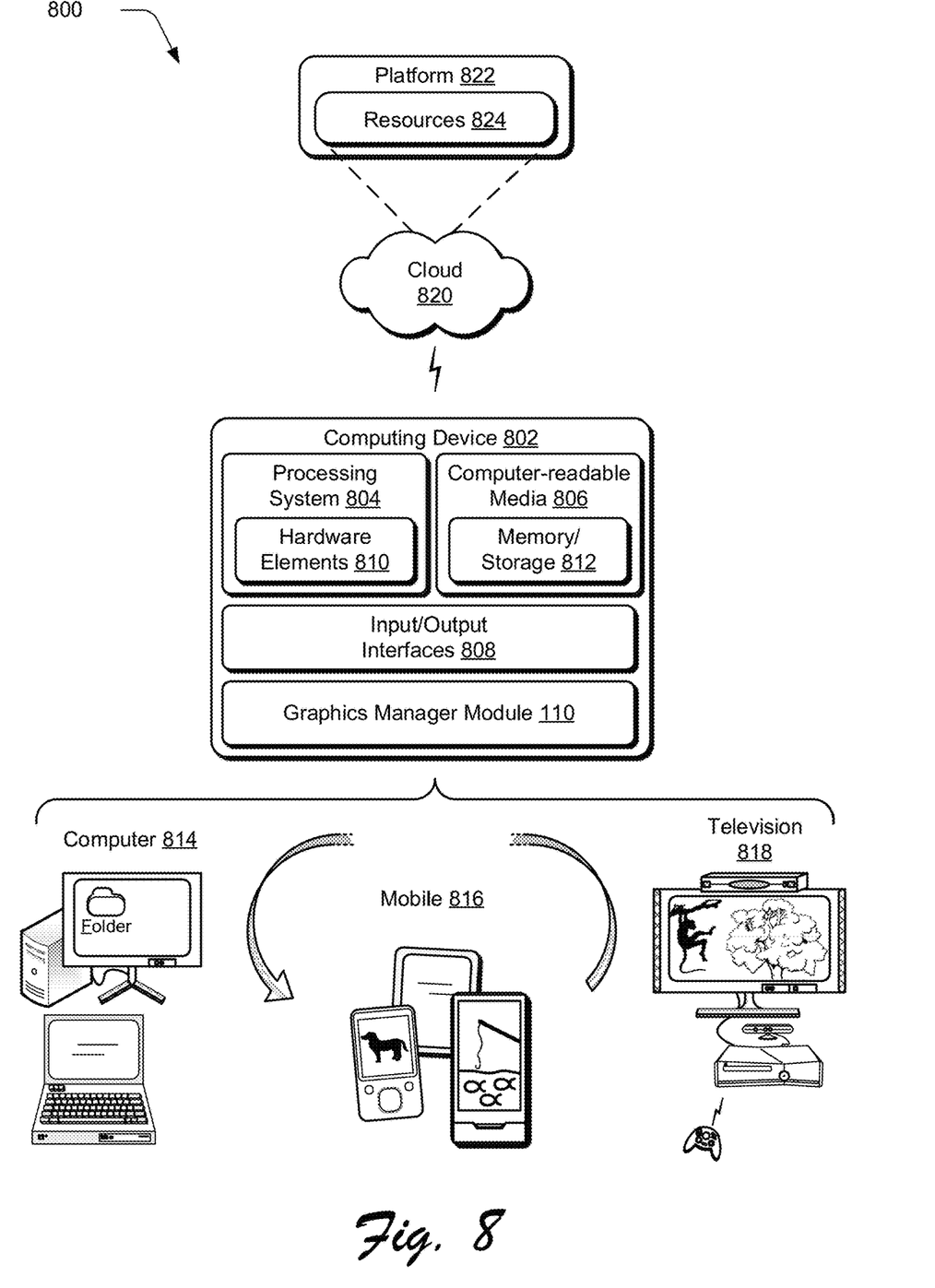
FIG. 8 illustrates an example system and computing device as described with reference to FIG. 1, which are configured to implement embodiments of techniques described herein.

FIG. 8 illustrates an example system generally at 800 that includes an example computing device 802 that is representative of one or more computing systems and/or devices that may implement various techniques described herein. For example, the computing device 102 discussed above with reference to FIG. 1 can be embodied as the computing device 802. The computing device 802 may be, for example, a server of a service provider, a device associated with the client (e.g., a client device), an on-chip system, and/or any other suitable computing device or computing system.

The example computing device 802 as illustrated includes a processing system 804, one or more computer-readable media 806, and one or more Input/Output (I/O) Interfaces 808 that are communicatively coupled, one to another. Although not shown, the computing device 802 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 804 is representative of functionality to perform one or more operations using hardware. Accordingly, the processing system 804 is illustrated as including hardware element 180 that may be configured as processors, functional blocks, and so forth. This may include implementation in hardware as an application specific integrated circuit or other logic device formed using one or more semiconductors. The hardware elements 810 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable media 806 is illustrated as including memory/storage 812. The memory/storage 812 represents memory/storage capacity associated with one or more computer-readable media. The memory/storage 812 may include volatile media (such as random access memory (RAM)) and/or nonvolatile media (such as read only memory (ROM), Flash memory, optical disks, magnetic disks, and so forth). The memory/storage 812 may include fixed media (e.g., RAM, ROM, a fixed hard drive, and so on) as well as removable media (e.g., Flash memory, a removable hard drive, an optical disc, and so forth). The computer-readable media 806 may be configured in a variety of other ways as further described below.

Input/output interface(s) 808 are representative of functionality to allow a user to enter commands and information to computing device 802, and also allow information to be presented to the user and/or other components or devices using various input/output devices. Examples of input devices include a keyboard, a cursor control device (e.g., a mouse), a microphone (e.g., for voice recognition and/or spoken input), a scanner, touch functionality (e.g., capacitive or other sensors that are configured to detect physical touch), a camera (e.g., which may employ visible or non-visible wavelengths such as infrared frequencies to detect movement that does not involve touch as gestures), and so forth. Examples of output devices include a display device (e.g., a monitor or projector), speakers, a printer, a network card, tactile-response device, and so forth. Thus, the computing device 802 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 802. By way of example, and not limitation, computer-readable media may include "computer-readable storage media" and "computer-readable signal media."

"Computer-readable storage media" may refer to media and/or devices that enable persistent storage of information in contrast to mere signal transmission, carrier waves, or signals per se. Thus, computer-readable storage media do not include signals per se. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 802, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, radio frequency (RF), infrared, and other wireless media.

As previously described, hardware elements 810 and computer-readable media 806 are representative of instructions, modules, programmable device logic and/or fixed device logic implemented in a hardware form that may be employed in some embodiments to implement at least some aspects of the techniques described herein. Hardware elements may include components of an integrated circuit or on-chip system, an application-specific integrated circuit (ASIC), a field-programmable gate array (FPGA), a complex programmable logic device (CPLD), and other implementations in silicon or other hardware devices. In this context, a hardware element may operate as a processing device that performs program tasks defined by instructions, modules, and/or logic embodied by the hardware element as well as a hardware device utilized to store instructions for execution, e.g., the computer-readable storage media described previously.

Combinations of the foregoing may also be employed to implement various techniques and modules described herein. Accordingly, software, hardware, or program modules and other program modules may be implemented as one or more instructions and/or logic embodied on some form of computer-readable storage media and/or by one or more hardware elements 810. The computing device 802 may be configured to implement particular instructions and/or functions corresponding to the software and/or hardware modules. Accordingly, implementation of modules that are executable by the computing device 802 as software may be achieved at least partially in hardware, e.g., through use of computer-readable storage media and/or hardware elements 810 of the processing system. The instructions and/or functions may be executable/operable by one or more articles of manufacture (for example, one or more computing devices 802 and/or processing systems 804) to implement techniques, modules, and examples described herein.

As further illustrated in FIG. 8, the example system 800 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 800, multiple devices are interconnected through a central computing device. The central computing device may be local to the multiple devices or may be located remotely from the multiple devices. In one embodiment, the central computing device may be a cloud of one or more server computers that are connected to the multiple devices through a network, the Internet, or other data communication link.

In one embodiment, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one embodiment, a class of target devices is created and experiences are tailored to the generic class of devices. A class of devices may be defined by physical features, types of usage, or other common characteristics of the devices.

In various implementations, the computing device 802 may assume a variety of different configurations, such as for computer 814, mobile 816, and television 818 uses. Each of these configurations includes devices that may have generally different constructs and capabilities, and thus the computing device 802 may be configured according to one or more of the different device classes. For instance, the computing device 802 may be implemented as the computer 814 class of a device that includes a personal computer, desktop computer, a multi-screen computer, laptop computer, netbook, and so on.

The computing device 802 may also be implemented as the mobile 816 class of device that includes mobile devices, such as a mobile phone, portable music player, portable gaming device, a tablet computer, a multi-screen computer, and so on. The computing device 802 may also be implemented as the television 818 class of device that includes devices having or connected to generally larger screens in casual viewing environments. These devices include televisions, set-top boxes, gaming consoles, and so on.

The techniques described herein may be supported by these various configurations of the computing device 802 and are not limited to the specific examples of the techniques described herein. For example, functionalities discussed with reference to the graphics manager module 110 may be implemented all or in part through use of a distributed system, such as over a "cloud" 820 via a platform 822 as described below.

The cloud 820 includes and/or is representative of a platform 822 for resources 824. The platform 822 abstracts underlying functionality of hardware (e.g., servers) and software resources of the cloud 820. The resources 824 may include applications and/or data that can be utilized while computer processing is executed on servers that are remote from the computing device 802. Resources 824 can also include services provided over the Internet and/or through a subscriber network, such as a cellular or Wi-Fi network.

The platform 822 may abstract resources and functions to connect the computing device 802 with other computing devices. The platform 822 may also serve to abstract scaling of resources to provide a corresponding level of scale to encountered demand for the resources 824 that are implemented via the platform 822. Accordingly, in an interconnected device embodiment, implementation of functionality described herein may be distributed throughout the system 800. For example, the functionality may be implemented in part on the computing device 802 as well as via the platform 822 that abstracts the functionality of the cloud 820.

Discussed herein are a number of methods that may be implemented to perform techniques discussed herein. Aspects of the methods may be implemented in hardware, firmware, or software, or a combination thereof. The methods are shown as a set of steps that specify operations performed by one or more devices and are not necessarily limited to the orders shown for performing the operations by the respective blocks. Further, an operation shown with respect to a particular method may be combined and/or interchanged with an operation of a different method in accordance with one or more implementations. Aspects of the methods can be implemented via interaction between various entities discussed above with reference to the environment 100.

CONCLUSION

Techniques for graphics processing using multiple primitives are described. Although embodiments are described in language specific to structural features and/or methodological acts, it is to be understood that the embodiments defined in the appended claims are not necessarily limited to the specific features or acts described. Rather, the specific features and acts are disclosed as example forms of implementing the claimed embodiments.

What is claimed is:

1. A method implemented by a computing device, the method comprising:
determining, by at least one processor, that at least one primitive at least partially overlaps one or more other primitives at a particular pixel region;
generating, by the at least one processor, processing instructions that specify that the at least one primitive and an overlapped portion of the one or more other primitives are to be processed together, wherein the processing instructions indicating that the at least one primitive and the overlapped portion of the one or more other primitives are to be processed together are to be written into memory for conserving computing resources, without intermediate processing results being written to the memory, wherein the processing instructions are generated in response to a detection of the portion of the at least one primitive overlapping the one or more other primitives and that the one or more overlapping primitives of the overlapped portion exceeds a threshold complexity, and wherein the processing instructions define how to process the at least one primitive and the overlapped portion of the one or more other primitive; and
submitting the processing instructions to a graphics processor separate from the at least one processor effective to cause a single primitive to be displayed.

2. The method as recited in claim 1, wherein said generating comprises generating the processing instructions to specify one or more visual effects that are to be applied to the single primitive, the one or more visual effects comprising at least one of clipping, opacity, shading, or an anti-aliasing procedure.

3. The method as recited in claim 1, wherein said generating comprises generating the processing instructions to specify that if one or more pixels of the at least one primitive are opaque, one or more pixels of the one or more other primitives overlapped by the one or more pixels of the at least one primitive are not to be processed.

4. The method as recited in claim 1, further comprising determining a difference between a pixel region for the at least one primitive that overlaps the one or more other primitives, and a pixel region for the one or more other primitives not overlapped by the at least one primitive, and wherein said generating comprises:
generating a first processing instruction which specifies that a combination of the at least one primitive and an underlying portion of the one or more other primitives are to be processed based on the pixel region for the at least one primitive; and
generating a second processing instruction which specifies that the one or more other primitives are to be processed based on the difference between the pixel region for the at least one primitive that overlaps the one or more other primitives, and the pixel region for the one or more other primitives not overlapped by the at least one primitive.

5. The method as recited in claim 4, wherein said determining the difference between the pixel region for the at least one primitive that overlaps the one or more other primitives, and the pixel region for the one or more other primitives not overlapped by the at least one primitive comprises:
determining whether the pixel region for the at least one primitive that overlaps the one or more other primitives meets or exceeds the threshold complexity;
if the pixel region for the at least one primitive that overlaps the one or more other primitives does not meet or exceed the threshold complexity, utilizing the at least one processor to calculate the difference; and
if the pixel region for the at least one primitive that overlaps the one or more other primitives meets or exceeds the threshold complexity, submitting a request to the graphics processor to calculate the difference.

6. The method as recited in claim 1, wherein the final processing results are to be written into memory via a single write operation.

7. The method as recited in claim 1, wherein the threshold complexity specifies a number of the primitives that are overlapped, which when the number of the primitives that are overlapped exceeds the number, causes the generation of the processing instructions.

8. The method as recited in claim 1, wherein the threshold complexity specifies an amount of pixel area of the overlapped primitives, which when the amount of the pixel area of the overlapped primitives exceeds the amount, causes the generation of the processing instructions.

9. The method as recited in claim 1, wherein instructions that specify that the at least one primitive and an overlapped portion of the one or more other primitives are to be processed together such that at least a portion of the at least one primitive and the overlapped portion of the one or more other primitives are combined into the single primitive for display and final processing results.

10. A system comprising:
at least one processor; and
one or more computer-readable storage media including instructions stored thereon that, responsive to execution by the at least one processor, cause the system to perform operations including:
determining that at least one primitive at least partially overlaps one or more other primitives at a particular pixel region;
generating processing instructions that specify that the at least one primitive and an overlapped portion of the one or more other primitives are to be processed together, wherein the instructions indicating that the at least one primitive and the overlapped portion of the one or more other primitives are to be processed together are to be written into memory, without intermediate processing results being written to the memory for conserving computing resources, wherein the processing instructions are generated in response to a detection of the portion of the at least one primitive overlapping the one or more other primitives and a detection that the overlapped portion exceeds a threshold complexity, and wherein the processing instructions define how to process the at least one primitive and the overlapped portion of the one or more other primitives; and submitting the processing instructions to a graphics processor separate from the at least one processor effective to cause a single primitive to be displayed.

11. The system as recited in claim 10, wherein said generating comprises generating the processing instructions to specify that if one or more pixels of the at least one primitive are opaque, one or more pixels of the one or more other primitives overlapped by the one or more pixels of the at least one primitive are not to be processed.

12. The system as recited in claim 10, wherein the operations further comprise:
   determining a difference between a pixel region for the at least one primitive that overlaps the one or more other primitives, and a pixel region for the one or more other primitives not overlapped by the at least one primitive, and wherein said generating comprises:
   generating a first processing instruction which specifies that a combination of the at least one primitive and an underlying portion of the one or more other primitives are to be processed based on the pixel region for the at least one primitive; and
   generating a second processing instruction which specifies that the one or more other primitives are to be processed based on the difference between the pixel region for the at least one primitive that overlaps the one or more other primitives, and the pixel region for the one or more other primitives not overlapped by the at least one primitive.

13. The system as recited in claim 12, wherein said determining the difference between the pixel region for the at least one primitive that overlaps the one or more other primitives, and the pixel region for the one or more other primitives not overlapped by the at least one primitive comprises:
   determining whether the pixel region for the at least one primitive that overlaps the one or more other primitives meets or exceeds the threshold complexity;
   if the pixel region for the at least one primitive that overlaps the one or more other primitives does not meet or exceed the threshold complexity, utilizing the at least one processor to calculate the difference; and
   if the pixel region for the at least one primitive that overlaps the one or more other primitives meets or exceeds the threshold complexity, sub-mitting a request to the graphics processor to calculate the difference.

14. The system as recited in claim 10, wherein said determining employs a spatial data structure to characterize the at least one primitive and the one or more other primitives to determine at least a portion of the particular pixel region.

15. One or more computer-readable storage media comprising instructions stored thereon that, responsive to execution by at least one processor of a computing device, cause the computing device to perform operations comprising:
   determining that at least one primitive at least partially overlaps one or more other primitives at a particular pixel region;
   generating, by the at least one processor, processing instructions that specify that the at least one primitive and the one or more other primitives are to be processed together, wherein the instructions indicating that the at least one primitive and the overlapped portion of the one or more other primitives are to be processed together being written to the memory for conserving computing resources, wherein the processing instructions are generated in response to a detection of the portion of the at least one primitive overlapping the one or more other primitives and the overlapped portion exceeds a threshold complexity, and wherein the processing instructions define how to process the at least one primitive and the one or more other primitives; and
   submitting the processing instructions to a graphics processor separate from the at least one processor.

16. The one or more computer-readable storage media as recited in claim 15, wherein said generating comprises generating the processing instructions to specify one or more visual effects that are to be applied to the at least one primitive and the one or more other primitives that are to be processed together, the one or more visual effects comprising at least one of clipping, opacity, shading, or an anti-aliasing procedure.

17. The one or more computer-readable storage media as recited in claim 15, wherein said generating comprises generating the processing instructions to specify that if one or more pixels of the at least one primitive are opaque, one or more pixels of the one or more other primitives overlapped by the one or more pixels of the at least one primitive are not to be processed.

18. The one or more computer-readable storage media as recited in claim 15, wherein the operations further comprise:
   determining a difference between a pixel region for the at least one primitive that overlaps the one or more other primitives, and a pixel region for the one or more other primitives not overlapped by the at least one primitive, and wherein said generating comprises:
   generating a first processing instruction which specifies that a combination of the at least one primitive and an underlying portion of the one or more other primitives are to be processed based on the pixel region for the at least one primitive; and
   generating a second processing instruction which specifies that the one or more other primitives are to be processed based on the difference between the pixel region for the at least one primitive that overlaps the one or more other primitives, and the pixel region for the one or more other primitives not overlapped by the at least one primitive.

19. The one or more computer-readable storage media as recited in claim 18, wherein said determining the difference between the pixel region for the at least one primitive that overlaps the one or more other primitives, and the pixel region for the one or more other primitives not overlapped by the at least one primitive comprises:
   determining whether the pixel region for the at least one primitive that overlaps the one or more other primitives meets or exceeds the threshold complexity;
   if the pixel region for the at least one primitive that overlaps the one or more other primitives does not meet or exceed the threshold complexity, utilizing the at least one processor to calculate the difference; and if the pixel region for the at least one primitive that overlaps the one or more other primitives meets or exceeds the threshold complexity, sub-mitting a request to the graphics processor to calculate the difference.

20. The one or more computer-readable storage media as recited in claim 15, wherein said determining employs a spatial data structure to characterize the at least one primitive and the one or more other primitives to determine at least a portion of the particular pixel region.

* * * * *